US006152020A

United States Patent [19]

Ikuta

[11] Patent Number: 6,152,020

[45] Date of Patent: Nov. 28, 2000

[54] SYSTEM FOR ALLOTTING SOUP WITH INGREDIENTS

[76] Inventor: Kazumasa Ikuta, Green Corp 301, 3-2, Horiguchi, Kanazawa-Ku, Yokohama, Japan

[21] Appl. No.: 09/301,328

[22] Filed: Apr. 29, 1999

[30] Foreign Application Priority Data

Apr. 12, 1999 [JP] Japan .................................. 11-103965

[51] Int. Cl.[7] ................................ A23L 1/00; A23L 1/39

[52] U.S. Cl. ................................ 99/352; 99/355; 99/357; 99/483; 222/1; 222/130; 222/135; 222/144.5; 426/589

[58] Field of Search ............................. 99/331, 332, 333, 99/334, 352, 353, 354, 355, 357, 483; 221/82; 222/94, 129.1, 135, 90, 74, 144.5, 105, 189.06, 318, 189.03, 481, 482, 484, 240, 282, 130, 129.4, 1; 426/589; 366/186

[56] References Cited

U.S. PATENT DOCUMENTS

| | | | |
|---|---|---|---|
| 2,682,984 | 7/1954 | Melikian et al. | 99/357 X |
| 3,185,348 | 5/1965 | Pollack et al. | 222/105 |
| 3,340,790 | 9/1967 | Simjian | 99/352 |
| 3,662,927 | 5/1972 | Cocks | 222/146.5 |
| 4,189,071 | 2/1980 | West | 222/129.1 |
| 4,357,861 | 11/1982 | Di Girolamo | 99/344 X |
| 4,359,935 | 11/1982 | Murray | 99/331 |
| 4,544,085 | 10/1985 | Frazer | 222/146.5 X |
| 4,603,793 | 8/1986 | Stern | 222/105 |
| 4,671,966 | 6/1987 | Giddey et al. | 426/589 |
| 4,748,902 | 6/1988 | Maurantonio | 99/326 |
| 4,860,923 | 8/1989 | Kirschner et al. | 222/1 |
| 5,178,895 | 1/1993 | Duckworth | 426/589 |
| 6,006,657 | 12/1999 | Ikuta | 99/331 |

*Primary Examiner*—Gabrielle Brouillette
*Assistant Examiner*—Robert Madsen
*Attorney, Agent, or Firm*—Armstrong, Westerman, Hattori, McLeland & Naughton

[57] ABSTRACT

A system for allotting soup to customers without possibility of scorching of the soup and to offer the soup with ingredients immediately by simply serving the soup each time. The system eliminates the possibility of causing variations in the quantity of ingredients or prevents impairment of the initial shape of the ingredients. The system comprises means for separating space in a container into a soup accommodating chamber and an ingredient accommodating chamber, which may be mixed with soup, to accommodate soup with ingredients. The system also includes means for accommodating a predetermined quantity of ingredients arranged at openings on the lower ends of the soup accommodating chamber and the ingredient accommodating chamber, and the opening on the lower end of the ingredient accommodating chamber is closed by separating means, which allows only the soup to pass.

10 Claims, 2 Drawing Sheets

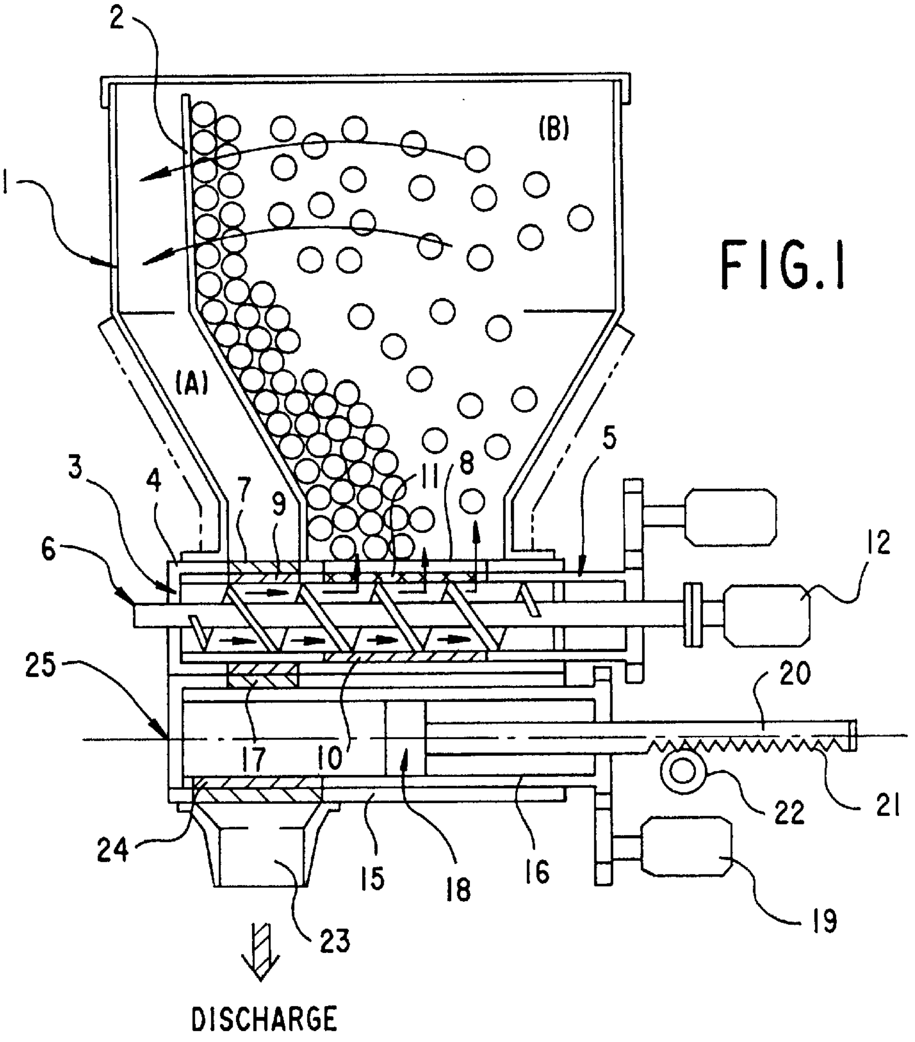
FIG.1
FIG.2
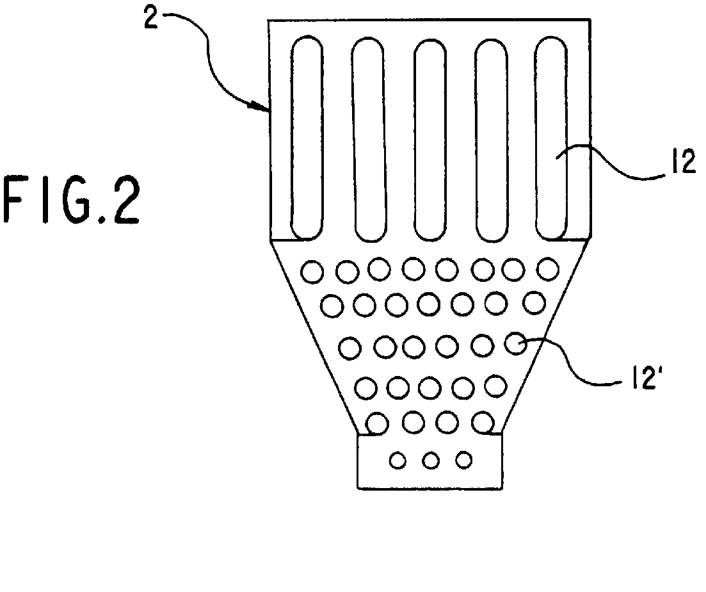

SYSTEM FOR ALLOTTING SOUP WITH INGREDIENTS

BACKGROUND OF THE INVENTION

The present invention relates to a system for allotting approximately constant quantity of ingredients to soup, such as miso soup, curried soup, and other soup, and for distributing a predetermined quantity of the soup with the ingredients to customers.

In restaurants, dining halls, or factory mess halls, it has been customary that canned food materials such as miso soup, curried soup, corn soup, corn chowder, etc. (10 to 20 liters in volume) as cooked in advance at other places are placed into a big pot. These soups always are kept in a warm condition by constant heating and are visually allotted and distributed in a predetermined quantity into containers for customers while being stirred with a large spoon or ladle.

As described above, the soup should be always being heated, and it is necessary to stir the soup almost constantly in order to prevent scorching. Special staff must be assigned for this purpose, and this leads to a cost increase for the soups due to the increase in personnel expenditures. Moreover, the quantity of ingredients mixed in the soup may not be maintained at constant level, and initial shape of the ingredients is often impaired due to frequent stirring.

In some cases, the soup is not heated at all times, but it is heated up each time before it is served to the customers. In this case, a certain time is required before the soup is fully heated up, and this causes inconveniences for the customers.

SUMMARY OF THE INVENTION

To solve the above problems, it is an object of the present invention to provide a system for allotting and distributing soup and ingredients, by which it is possible to offer soup with ingredients for the customer by merely serving each time it is offered to the customer and also to evenly distribute the quantity of the ingredients to be mixed in the soup.

It is another object of the present invention to provide a system for allotting and distributing, by which it is possible to offer soup with ingredients to the customers by preventing scorching of the soup and by avoiding collapse of the initial shape of the ingredients.

It is still another object of the present invention to provide a system for allotting and distributing, by which it is possible to achieve better convection of the soup and also to move ingredients of the soup from the upper portion to the lower portion of a partition plate by convection.

To attain the above objects, the system of the present invention allots and distributes soup with ingredients to a soup containing approximately a constant quantity of ingredients, whereby the system comprises means for separating a space of a container to a soup accommodating chamber and an ingredient accommodating chamber (may be mixed with soup) in a container for accommodating soup with ingredients, means for accommodating a predetermined quantity of ingredients and arranged at openings on the lower ends of the soup accommodating chamber and the ingredients accommodating chamber, and the opening on the lower end of the ingredient accommodating chamber is closed by separating means, which allows only the soup to pass.

The above and other objects and advantages of the invention will become more apparent from the description given below.

BRIEF DESCRIPTION OF THE DRAWINGS

FIG. 1 is a cross-sectional view of an embodiment of the present invention;

FIG. 2 is a front view of means for separating into a soup accommodating chamber and an ingredient accommodating chamber;

DETAILED DESCRIPTION OF THE PREFERRED EMBODIMENT

Figure 3:
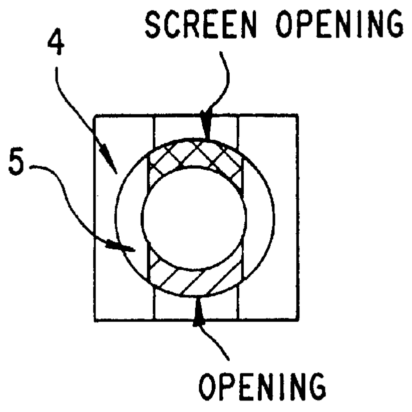
FIG. 3 is a cross-sectional view of a screw valve when ingredients and soup are accommodated in the screw valve.

In the following, description will be given on an embodiment of the present invention.

FIG. 1 and FIG. 2 each represents an embodiment of the present invention. A container (pot) 1 is separated to a soup accommodating chamber (A) and an ingredient accommodating chamber (soup may be mixed in it) (B) by a stainless steel partition wall 2 erected in a longitudinal direction. Soup with ingredients is injected into the ingredient accommodating chamber (B).

By selecting the position of the partition wall 2, it can be designed in such manner that the ingredient accommodating chamber (B) contains only the ingredients, while soup may be contained to some extent.

It is preferable to heat up the soup to 65 to 100° C., or more preferably to 65 to 70° C., but there is no special restriction on the heating means. For example, the outer side of the container 1 may be heated up by heater, or it may be heated by filling hot water into a space between the container 1 and outer tube, or an immersion heater may be immersed into the soup to heat it up.

As separating means (separator) 2 for separating the ingredients from the soup in the present invention, a plate provided with a plurality of oblong holes or a screen plate as in the above embodiment may be used.

As shown in FIG. 1, a screw valve 3 is removably connected to a container 1 via packings.

The screw valve 3 comprises an outer tube 4 (outer valve) in form of a rectangular cylinder with a cylindrical bore formed in it where an inner tube 5 (inner valve) in cylindrical shape is rotatably engaged, and a bar-like member 6 (screw) with spiral ridges formed on it is inserted.

On the outer tube 4, there are provided openings 7 and 8, opening 8 is communication with an opening on the lower end of the ingredient accommodating chamber (B) and opening 7 is in communication with an opening on the lower end of the soup accommodating chamber (A).

On the inner tube 5, there are provided an opening 9 to be communicated with the opening 7, an opening 10 and a screen opening 11 to be communicated with the opening 8. The opening 10 and the screen opening 11 are arranged at opposite positions on the inner tube 5 in the above embodiment.

The screw 6 placed in the inner tube 5 is axially fixed on the inner tube 5, and it can be rotated by a motor 12.

FIG. 1 shows a condition where the soup is heated up. The opening 9 of the inner tube 5 is in communication with the opening 7 of the outer tube 4, and the screen opening 11 of the inner tube 5 is in communication with the opening 8 of the outer tube 4.

When the heater in the container is turned on under this condition and the screw is continuously rotated in reverse direction (counterclockwise) at the same time, the soup is sent from the chamber (B) through the partition plate 2 and the screw valve 3 and is heated up while it is moved counterclockwise by convection, and it is sent back to the container 1.

Therefore, the soup can be stirred up by convection without using a stirrer as in the conventional type system. This eliminates scorching of the soup on inner wall of the container 1 and it is also helpful in heating up the ingredients without impairing the initial shape of the ingredients.

During the convection of the soup as described above, the ingredients are blocked by the partition plate 2 and are gently moved downward from above along the partition plate 2.

As shown in FIG. 2, larger holes (oblong holes) 12 are arranged on the upper portion of the partition plate 2, and smaller holes 12' are formed on the lower portion of the partition plate 2.

Because diameter of holes is gradually decreased toward the lower portion, it facilitates convection of the soup, and the ingredients can be easily moved from the upper portion toward the lower portion of the partition plate 2.

When reaching the lower portion of the partition plate 2, the ingredients are moved upward by pumping action caused by rotation of the screw 6, and this procedure is repeatedly performed.

In the above embodiment, the partition plate 2 is erected approximately in vertical direction from below and it is first diagonally bent and is then directed again in vertical direction.

The shape of the partition plate 2 is not limited to the above. However, by the above design of the partition plate 2, the ingredients can be more easily moved.

It may be designed in such manner that, when temperature in the container 1 reaches a predetermined level (e.g. about 80° C.), the heater is turned off, and stirring of the soup is stopped. When soup temperature is decreased to a predetermined level (e.g. about 65° C.), the heater is turned on and the soup again is stirred up.

When soup temperature is within the predetermined temperature range (e.g. about 65° C. to 80° C.), the stirring by the screw 6 is stopped. Then, the ingredients are brought together at the bottom of the chamber (B) in the container 1.

Figure 4:
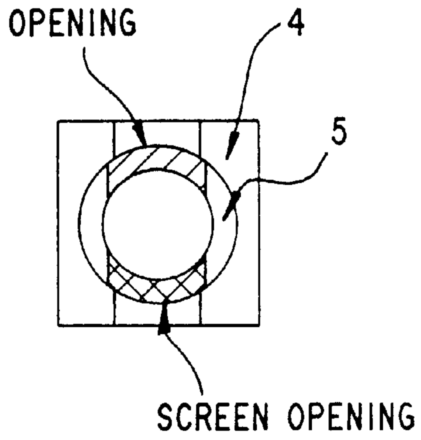
FIG. 4 is a cross-sectional view of the screw valve when ingredients and soup are accommodated in a piston valve.

The inner tube 5 of the screw valve 3 is then rotated by 180° C. from the condition shown in FIG. 3 to the condition shown in FIG. 4. Under the condition shown in FIG. 3, the opening of the inner tube 5 is covered with the screen 11, and the ingredients cannot enter the screw valve 3. However, under the condition shown in FIG. 4, the inner tube 5 is communicated with the chamber (B), and the ingredients drop into the inner tube 5 of the screw valve.

When the screw 6 is gently rotated clockwise (by such turns of rotation that a predetermined quantity of ingredients can be introduced), the ingredients can be dropped down in a predetermined quantity between pitches of the screw 6. At the same time, the soup is mixed.

In this way, when internal space of the screw valve 3 is filled up, the inner tube 5 is rotated by 180° from the condition shown in FIG. 4 to the condition shown in FIG. 3. Then, the ingredients in the chamber (B) are blocked by the screen 11 and cannot enter the screw valve 3. As a result, the ingredients are allotted approximately in a constant quantity.

On the lower surface of the outer tube 4, a cylinder body 15 in shape of long rectangular cylinder, serving as an outer valve of the piston valve 25, is mounted. On the upper surface of the cylinder body 15, an opening 17 is formed at a position to communicate with the opening 7 on the lower surface of the outer tube 4, and the openings 7 and 17 are connected with each other via packings.

On the cylinder body 15 serving as outer valve, a volumetric tube 16 serving as an inner tube is rotatably fitted. On rear portion of the volumetric tube 16, an extrusion rod 18 is movably fitted.

The volumetric tube 16 is rotated by a motor 19.

In the above embodiment, the inner tube 5 and the volumetric tube 16 are rotated by engaging a gear fixed on rotation shaft of the motor with a gear fixed on the rear end of the inner tube 5 and the volumetric tube 16.

In the above embodiment, a rack gear 21 is formed on a rod 20, which is connected to a piston unit at the head of the extrusion rod, and the extrusion rod 18 is moved forward or backward by rotating a gear 22 engaged with the rack gear 21 in normal or reverse direction by the motor.

On the lower surface of the cylinder body 15, an opening 23 to pick up the soup and the ingredients is arranged.

Figure 5:
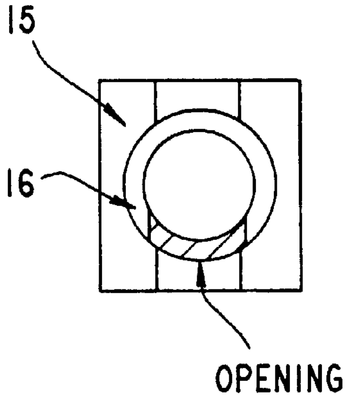
FIG. 5 is a cross-sectional view of the piston valve when ingredients and soup are accommodated in the screw valve.

Under the condition as shown in FIG. 3, the soup is communicated with the internal space of the screw valve 3, and the volumetric tube 16 blocks the outer tube 4 of the screw valve as shown in FIG. 5.

Figure 6:
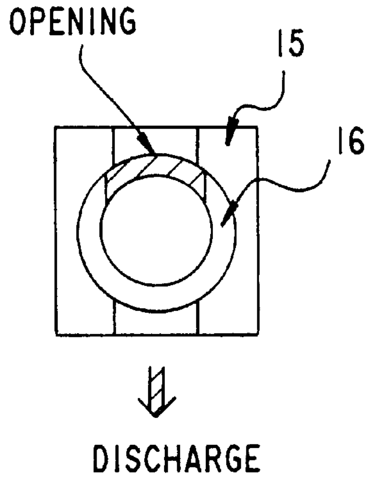
FIG. 6 is a cross-sectional view of the piston valve when ingredients and soup are accommodated in the piston valve.

When it is rotated by 180° from the condition shown in FIG. 5 to the condition shown in FIG. 6, an opening 24 of the volumetric tube 16 faces upward and communicates with the internal space of the screw valve 3.

When the extrusion rod 18 is pulled backward, the soup and the ingredients drop into the volumetric tube 16. Under this condition, the opening 23 of discharge unit of the piston valve is closed, and a chamber of volumetric discharge filled with ingredients and soup is formed depending upon the position of the extrusion rod 18 (setting of volumetric discharge).

The volumetric tube 16 is rotated by 180° to turn to the condition shown in FIG. 5. Then, the opening of the screw valve is closed, and the ingredients and the soup drop from the opening 23 of the discharge unit into the container for allotting. Because the extrusion rod 18 is moved forward at the same time, all of the ingredients and soup in the piston valve can be discharged.

In the above embodiment, the opening on the lower end of the ingredient accommodating chamber can be covered with the screen opening 11, whereas it may be designed in such manner that it may be covered with a porous opening.

In any way, there is no special restriction on the separating means so far as it is the separating means, by which only the soup can be dropped down and the ingredients cannot.

In case there is no need to stir up the soup, the screw valve is not necessarily required, and the piston valve may be directly connected to the lower end of the container 1. When the piston valve is arranged at a predetermined position and a predetermined quantity of ingredients is dropped down and the piston valve is moved back to a predetermined position as a screen opening, the ingredients and the soup can be allotted approximately in a constant quantity.

The system of the present invention can be used for any applications for allotting and distributing soups (such as miso soup, curry soup, or other types of soup) with ingredients to each portion per head of the customer.

According to the present invention, ingredients and soup are automatically allotted and distributed and are mixed in approximately constant quantity. Thus, mixing quantity of ingredients can be allotted in approximately constant quantity, and the soup and ingredients can be allotted to each portion per head of the customer (about 180 to 200 cc).

According to the present invention, the mixing quantity of soups to be allotted can be allotted in approximately constant quantity and can be allotted to each portion per head of the customer. This makes it possible to extensively reduce working cost required for allotting soups, to avoid scorching of soups and to prevent the impairment of the initial shape of the ingredients.

What is claimed is:

1. A system for allotting soup containing ingredients into soup portions containing approximately constant quantity of ingredients, said system comprising a container, means for separating the container into a soup accommodating chamber and an ingredient accommodating chamber, an opening at the lower end of the soup accommodating chamber and an opening at the lower end of the ingredient accommodating chamber, means for accommodating a predetermined quantity of ingredients arranged at the openings at the lower ends of the soup accommodating chamber and the ingredient accommodating chamber, the opening at the lower end of the ingredient accommodating chamber closable by separating means, so as to allow only the soup to pass therethrough.

2. A system according to claim 1, further including a first chamber with a predetermined volume positioned below an opening in the container said opening being openable or closable at the lower portion of an accommodation chamber with means for accommodating a predetermined quantity of ingredients placed therein.

3. A system according to claim 2, wherein said means for accommodating the predetermined quantity of ingredients includes a rotary bar-like member with spiral ridges formed thereon in the first chamber, and the opening on the lower end of said soup accommodating chamber communicates with said first chamber.

4. A system according to claim 1, wherein said means for separating the container into said soup accommodating chamber and said ingredient accommodating chamber includes a partition wall with a plurality of holes therein which allows only soup to pass therethrough.

5. A system according to claim 4, wherein said holes on an upper portion of said partition wall are larger than on a lower portion of the partition wall.

6. A system according to claim 3, further including an outer tube having openings communicating with the opening at the lower end of said soup accommodating chamber and the opening at the lower end of said ingredient accommodating chamber arranged on a lower end of said container, an inner tube rotatably fitted to said outer tube, said inner tube having an opening communicating with the opening of said ingredient accommodating chamber, a screen or porous member to cover the opening of the ingredient accommodating chamber, and an opening communicating with the opening at the lower end of said soup accommodating chamber, and said rotary bar-like member with spiral ridges formed thereon is inside the inner tube.

7. A system according to claim 6, further including a cylinder body connected to a lower portion of said outer tube such that an opening of said cylinder body communicates with the opening of said outer tube, a volumetric tube is rotatably fitted on said cylinder body, whereby after an opening of said volumetric tube, the opening on the lower portion of said outer tube and the opening of said inner tube are aligned and the ingredients and the soup are taken into the volumetric tube, the volumetric tube is rotated, and said communicated openings are closed, a predetermined quantity of ingredients and soup can be accommodated into said volumetric tube.

8. A system according to claim 7, where said first chamber with the predetermined volume is a chamber having an extrusion rod slidably fitted into an opening on rear portion of said volumetric tube.

9. A system according to claim 8, wherein said volumetric tube has an outlet formed on the lower surface of said volumetric tube, said outlet being aligned with the opening of said volumetric tube, whereby, by moving forward said extrusion rod fitted on the volumetric tube, the soup and the ingredients can be fed into a predetermined container.

10. A system according to claim 6, wherein the opening at the lower end of said ingredient accommodating chamber is covered with screen or porous member of said inner tube, the opening on the lower end of said soup accommodating chamber communicates with the opening of the inner tube so as to allow the soup to pass, whereby, as the bar-like member is rotated in a direction opposite to a direction to send the ingredients forward in order to the ingredients upward, the soup is circulated from the container through the opening of the inner tube, through the inner tube, and through the opening covered with screen or porous member of the inner tube to the container.

* * * * *